US012684083B2

(12) United States Patent
Wang et al.

(10) Patent No.: US 12,684,083 B2
(45) Date of Patent: Jul. 14, 2026

(54) POSITION ADJUSTMENT ASSEMBLY AND PROMPTER

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 213 days.

(21) Appl. No.: 18/406,450

(22) Filed: Jan. 8, 2024

(65) Prior Publication Data

US 2025/0142015 A1 May 1, 2025

(30) Foreign Application Priority Data

Oct. 25, 2023 (CN) .......................... 202322883387.7

(51) Int. Cl.
| | |
|---|---|
| *G02B 7/00* | (2021.01) |
| *F16M 11/18* | (2006.01) |
| *F16M 11/20* | (2006.01) |
| *G02B 7/182* | (2021.01) |
| *G02B 26/08* | (2006.01) |
| *H04N 5/222* | (2006.01) |

(52) U.S. Cl.
CPC ........... *H04N 5/2222* (2013.01); *F16M 11/18* (2013.01); *F16M 11/2092* (2013.01); *G02B 7/182* (2013.01); *G02B 26/0816* (2013.01)

(58) Field of Classification Search
CPC ........... H04N 5/2222; F16M 2200/027; G02B 26/0816
USPC ............................... 248/125.8; 348/375, 722
See application file for complete search history.

(56) References Cited

U.S. PATENT DOCUMENTS

| | | | | |
|---|---|---|---|---|
| 2,458,961 | A * | 1/1949 | Snyder ...................... | B66F 3/14 248/354.4 |
| 2,762,599 | A * | 9/1956 | Faris ....................... | E21D 15/24 248/354.5 |
| 2,858,694 | A * | 11/1958 | Akins ........................ | E04C 3/32 52/294 |
| 4,221,363 | A * | 9/1980 | Jasper ....................... | B66F 3/08 411/432 |
| 4,577,827 | A * | 3/1986 | Eliscu .................. | F16M 11/125 396/419 |
| 4,726,555 | A * | 2/1988 | Andrews ................ | A47B 97/04 248/124.1 |
| 5,282,593 | A * | 2/1994 | Fast ......................... | A47B 9/04 248/188.4 |
| 5,890,768 | A * | 4/1999 | Beurteaux .......... | B60N 2/01558 297/216.16 |
| 6,568,237 | B1 * | 5/2003 | Graham ................. | B21D 1/145 72/457 |
| 6,766,996 | B1 * | 7/2004 | Somers .............. | G01R 31/2887 248/650 |

(Continued)

*Primary Examiner* — Nkeisha Smith
(74) *Attorney, Agent, or Firm* — Westbridge IP LLC

(57) ABSTRACT

Disclosed are a position adjustment assembly and a prompter. The position adjustment assembly includes a base and a telescopic seat. The bottom of the telescopic seat is movably installed on the base. The telescopic seat includes an outer shell and an inner shell slidably nested inside the outer shell. The inner shell is telescoped along the outer shell.

10 Claims, 13 Drawing Sheets

(56)                 References Cited

U.S. PATENT DOCUMENTS

| 7,044,423 | B2 * | 5/2006 | Bober | F16M 11/18 |
| | | | | 248/188.4 |
| 7,908,981 | B2 * | 3/2011 | Agee | A47B 9/04 |
| | | | | 248/188.4 |
| 9,118,824 | B2 * | 8/2015 | Vito | H04N 23/51 |
| 9,322,504 | B2 * | 4/2016 | Davi | B25H 1/10 |
| 9,534,731 | B2 * | 1/2017 | White | F16M 13/02 |
| 11,913,601 | B2 * | 2/2024 | Herst | G03B 30/00 |
| 11,980,827 | B2 * | 5/2024 | Shilo | F16H 25/2056 |
| 2009/0256970 | A1 * | 10/2009 | Bilbrey | H04N 5/2222 |
| | | | | 348/722 |

* cited by examiner

2011

201

202

POSITION ADJUSTMENT ASSEMBLY AND PROMPTER

CROSS-REFERENCE TO RELATED APPLICATIONS

This application claims priority to Chinese Patent Application No. 202322883387.7, filed on Oct. 25, 2023, the entire contents of which are incorporated herein by reference.

TECHNICAL FIELD

The present application relates to the technical field of prompter devices, in particular to a position adjustment assembly and a prompter.

BACKGROUND

The basic structure of an existing prompter consists of three parts: a reflection member, a support member for placing a display device, and an installation member for installing a camera. The support member is in front of the reflection member, and the installation part is behind the reflection member. The reflection member reflects the information on the display device for the recorder to watch, and the camera shoots the recorder. In addition, the back of the reflection member is also connected with a blackout cloth. The end of the blackout cloth is provided with an opening. When installing a camera on the installation member, the lens of the camera needs to be installed at the opening of the blackout cloth.

In the related art, when the camera is installed at the installation member, it often can only adjust the horizontal position of the camera, that is, it can only adjust the horizontal position between the lens of the camera and the opening of the blackout cloth, but cannot adjust the vertical position between the lens of the camera and the opening of the blackout cloth.

SUMMARY

A main objective of the present application is to provide a position adjustment assembly, aiming to solve a problem that the vertical position between the lens of the camera and the opening of the blackout cloth cannot be adjusted.

In order to achieve the above objective, the position adjustment assembly provided by the present application includes a base and a telescopic seat. A bottom of the telescopic seat is movably installed on the base. The telescopic seat includes an outer shell and an inner shell slidably nested inside the outer shell, and the inner shell is telescoped along the outer shell.

In an embodiment, a telescopic member is provided inside the telescopic seat, one end of the telescopic member is connected to the outer shell, and another end of the telescopic member is connected to the inner shell.

In an embodiment, the telescopic member includes: a screw fixed to the outer shell; a moving rod threaded on an outer side of the screw and rotatably connected to the inner shell; and a driving member configured to drive the moving rod to rotate relative to the screw, so that the moving rod spins out or spins in the screw to drive the inner shell to extend or retract relative to the outer shell.

In an embodiment, the telescopic member includes: a screw fixed to the inner shell; a moving rod threaded on an outer side of the screw and rotatably connected to the outer shell; and a driving member configured to drive the moving rod to rotate relative to the screw, so that the moving rod spins out or spins in the screw to drive the inner shell to extend or retract relative to the outer shell.

In an embodiment, the driving member includes a driven member fixed on an outer side of the moving rod, an active member cooperating with the driven member, and a second driving member. An upper end of the outer shell is provided with a first avoidance notch extending in a telescoping direction of the inner shell, the active member is passed through the inner shell and the first avoidance notch in sequence and extended to an outer side of the outer shell, and the second driving member is located on the outer side of the outer shell and connected to the active member.

In an embodiment, the active member is configured to be a worm, the driven member is configured to be a worm gear, and the worm gear is fixed on the outer side of the moving rod; the second driving member is configured to be a knob for operating a rotation of the worm.

In an embodiment, the active member includes a rod and a worm, the driven member is configured to be a worm gear, and the worm gear is fixed on the outer side of the moving rod; the second driving member is configured to be a knob for operating a rotation of the worm; one end of the rod is coupled with the worm, the other end of the rod is passed through the inner shell and the first avoidance notch in sequence and extended to the outer side of the outer shell, and the knob is located on the outer side of the outer shell and connected to the active member.

In an embodiment, a bottom of the outer shell is slidably installed on the base.

In an embodiment, the position adjustment assembly further includes a limit sleeve connected to the outer shell, a positioning column slidably installed on the limit sleeve, and an operation piece. One end of the positioning column directly faces the base, another end of the positioning column faces the operation piece, and the operation piece is configured to move to drive the positioning column to press or release the base.

In an embodiment, the inner shell further includes a second avoidance notch, the limit sleeve comprises a threaded hole, an axis of the threaded hole intersects an axis of the limit sleeve, the limit sleeve is passed through the second avoidance notch and arranged inside the inner shell. A top end of the positioning column is arc-shaped or hemispherical. The operation piece is configured to be a screw cooperating with the threaded hole. One end of the screw is connected to a first driving member, another end of the screw is arc-shaped or hemispherical. An arc-shaped surface or a hemispherical end face of the screw faces an arc-shaped surface or a hemispherical end face of the positioning column when the screw is passed through the threaded hole. The arc-shaped surface or hemispherical end face of the screw is configured to abut or move away from the arc-shaped surface or hemispherical end face of the positioning column to push the positioning column to press or to release the base.

In an embodiment, an axis of the threaded hole located at the limit sleeve is perpendicular to an axis of the limit sleeve.

The present application further provides a prompter, which includes a reflection member, a front support plate and any one of the position adjustment assemblies mentioned above. The front support plate is configured to place a display device, and the reflection member is configured to reflect content displayed by the display device.

In the technical solutions of the present application, the position adjustment assembly is applied to the prompter, the camera can be installed on the telescopic seat of the position adjustment assembly. By adjusting the distance between the camera and the frame through the sliding cooperation between the telescopic seat and the base, the horizontal position adjustment function of the camera can be realized. When it needs to adjust the height of the camera, it can be adjusted through the telescopic seat, which allows the lens of the camera and the opening of the blackout cloth to be horizontal, and then cameras of different specifications can be used in the prompter. Meanwhile, through the sliding adjustment, the difficulty of adjusting the camera in the prompter can be reduced, and the convenience of adjusting the device is improved.

BRIEF DESCRIPTION OF THE DRAWINGS

In order to more clearly illustrate the technical solutions in the embodiments of the present application or in the related art, drawings that are needed to illustrate the embodiments and the related art are simply introduced below. Obviously, drawings introduced below are just some of the embodiments in the present application. For those of ordinary skill in the art, other figures may be further obtained without creative efforts according to the structures shown in drawings below.

Figure 1:
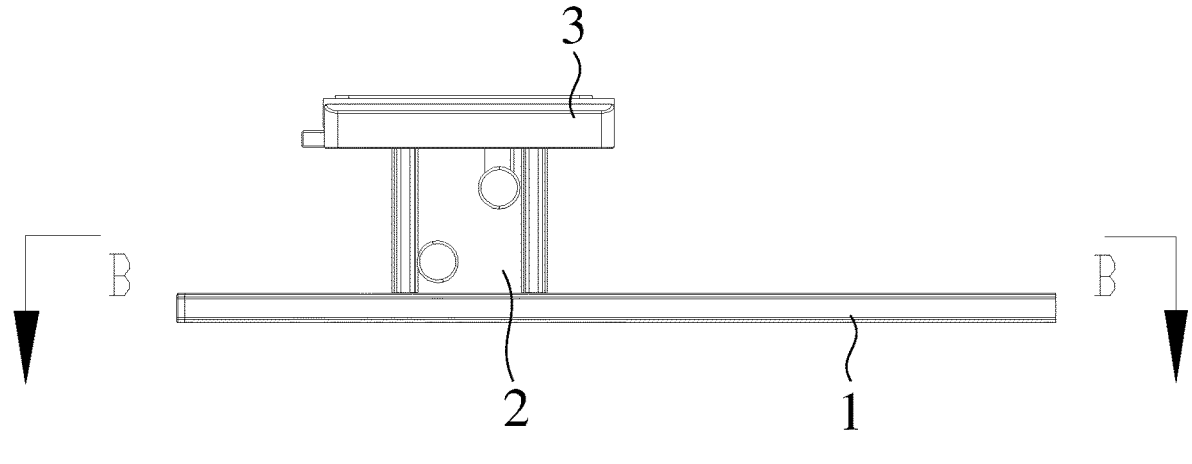
FIG. 1 is schematic structural view of a base and a telescopic seat being mated according to an embodiment of a position adjustment assembly of the present application.

The realization of purposes, functional features and advantages will be further illustrated in conjunction with the embodiments and with reference to the drawings.

DETAILED DESCRIPTION OF THE EMBODIMENTS

The technical solutions of the embodiments of the present application will be clearly and completely described in conjunction with the accompanying drawings. It is obvious that the embodiments to be described are only some rather than all the embodiments of the present application. All other embodiments obtained by those skilled in the art based on the embodiments of the present application without creative efforts should fall within the scope of the present application.

It should be noted that all the directional indications (such as up, down, left, right, front, rear, etc.) in the embodiments of the present application are only used to explain the relative positional relationship, movement, or the like of the components in a certain posture. If the posture changes, the directional indication will change accordingly.

In the present application, unless otherwise specifically specified and limited, the terms "connected", "fixed", etc. should be understood in a broad sense, for example, "fixed" can be a fixed connection, a detachable connection, or be integrated as a whole; "connected" can be a mechanical connection or an electrical connection; can be directly connected, or indirectly connected through an intermediate medium, or can be the internal communication between two elements or the interaction relationship between two elements. For those of ordinary skilled in the art, the specific meaning of the above-mentioned terms in the present application can be understood according to specific situations.

Besides, the descriptions associated with, "first" and "second", etc. in the present application are merely for descriptive purposes, and cannot be understood as indicating or suggesting relative importance or implicitly indicating the number of the indicated technical feature. Therefore, the feature associated with "first" or "second" can expressly or implicitly include at least one such feature. Moreover, the meaning of "and/or" appearing in the present application includes three parallel scenarios. For example, "A and/or B" includes only A, or only B, or both A and B. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

The present application provides a position adjustment assembly applied to a prompter. The prompter includes a reflection member 6 and a front support plate 4. The front support plate 4 is used to place electronic devices such as mobile phones, tablets, etc., the reflection member 6 is used to reflect the prompts displayed by the display device to a side away from the camera.

Figures 6, 7:
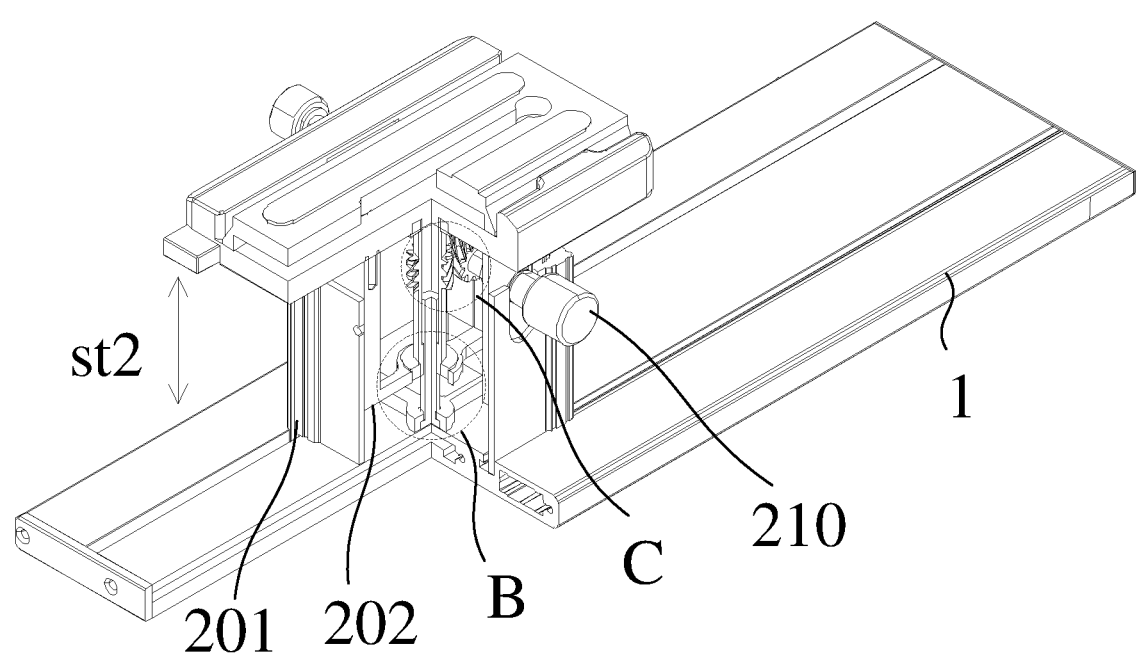
FIG. 6 is a schematic partial sectional view of the position adjustment assembly in FIG. 1.
FIG. 7 is an enlarged view of part C in FIG. 6.
Figure 8:
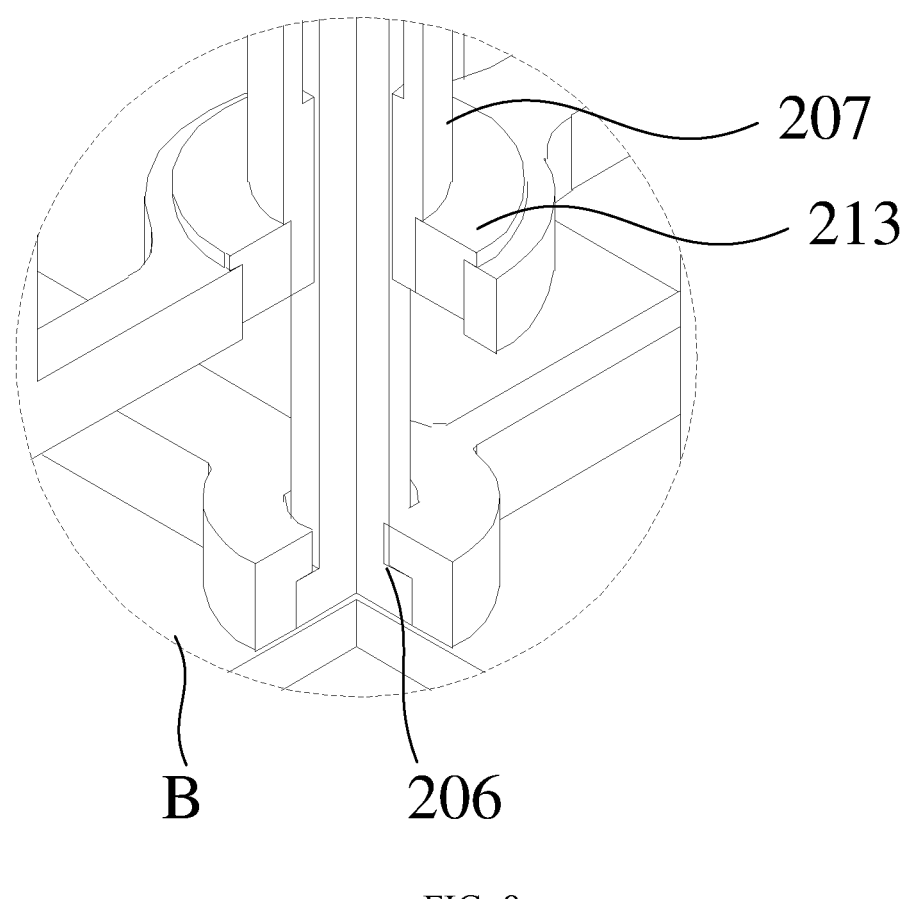
FIG. 8 is an enlarged view of part B is FIG. 6.
Figure 10:
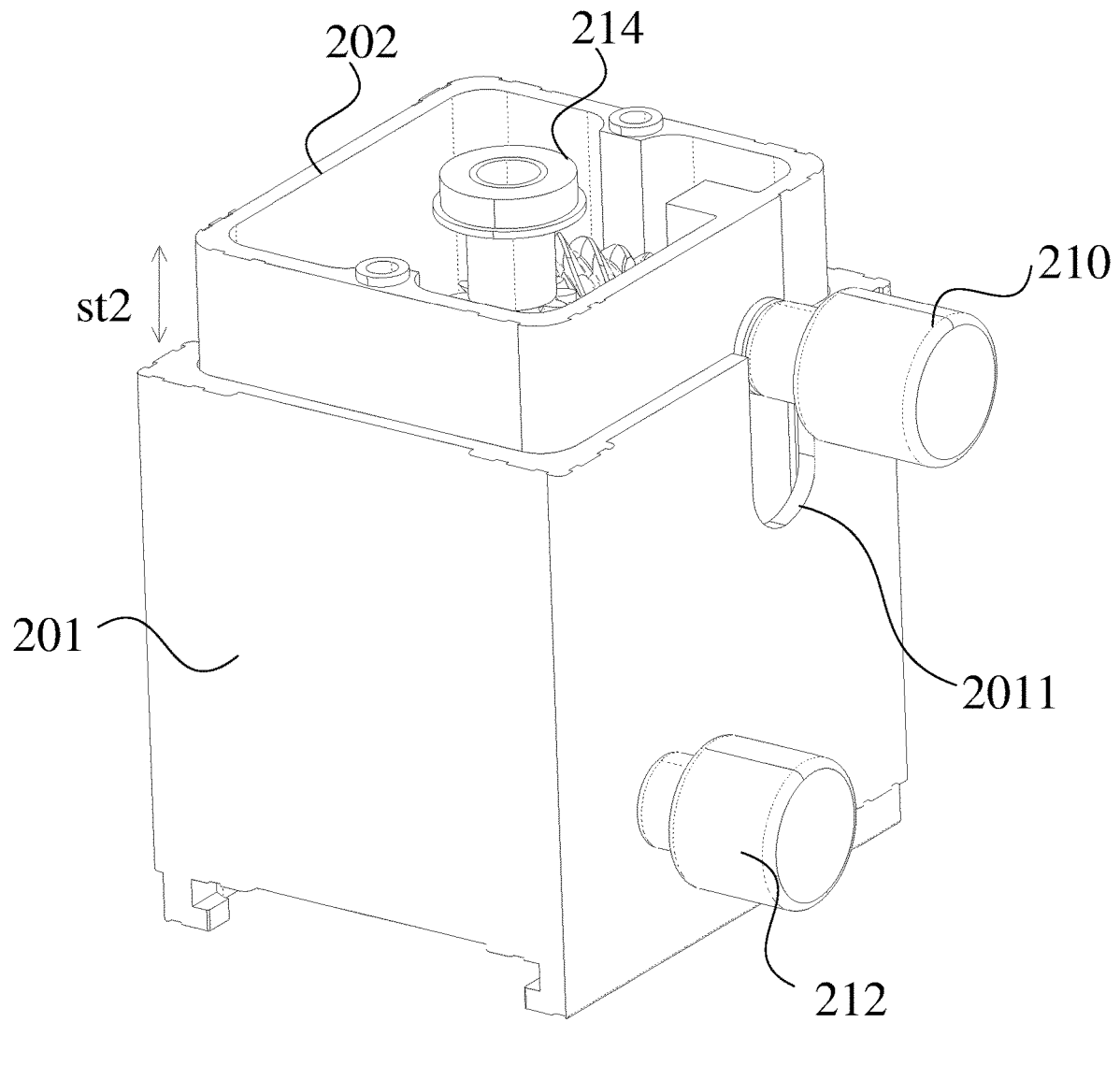
FIG. 10 is a schematic external structural view according to an embodiment of the telescopic seat in FIG. 5.

In an embodiment of the present application, the position adjustment assembly includes a base 1 and a telescopic seat 2. The bottom of the telescopic seat 2 is movably installed on the base 1. The telescopic seat 2 includes an outer shell 201 and an inner shell 202 slidably nested inside the outer shell 201. The inner shell 202 can be telescoped along the outer shell 201, that is, as shown in FIGS. 6 and 10, the inner shell 202 can be telescoped inside the outer shell 201 along direction st2, so as to adjust the height of the telescopic seat 2, and to adjust the vertical height of the lens of the camera installed on the fast installation plate 5 mounted on the top of the inner shell 202 relative to the opening 602 of the blackout cloth. In the above-mentioned, the bottom of the telescopic seat 2 is movably installed on the base 1, and the purpose of which is to adjust the position of the telescopic seat 2 on the base 1. By adjusting the relative horizontal position between the telescopic seat 2 and the opening 602, the relative horizontal position between the lens of the camera installed on the telescopic seat 2 and the opening 602 can be adjusted, which is beneficial for the lens to enter the opening. The telescopic seat 2 can be slidably installed on the base 1, and also, threaded holes or connection holes can be opened on the base 1 along the orientation of the sliding of the telescopic seat 2, and the telescopic seat 2 can be fixed on a desirable horizontal location of the base 1 by one screw or bolt selectively engaged into one threaded hole or connection hole. In this technical solution, by adjusting the horizontal and vertical position of the telescopic seat 2 on the base 1 relative to the opening 602 of the reflection member 6, the horizontal and vertical position of the lens of the camera installed on the telescopic seat 2 can be adjusted, which allows the lens to be aligned to and to pass through the opening 602 to enter the blackout cloth 601 to prevent external light interference.

Figure 2:
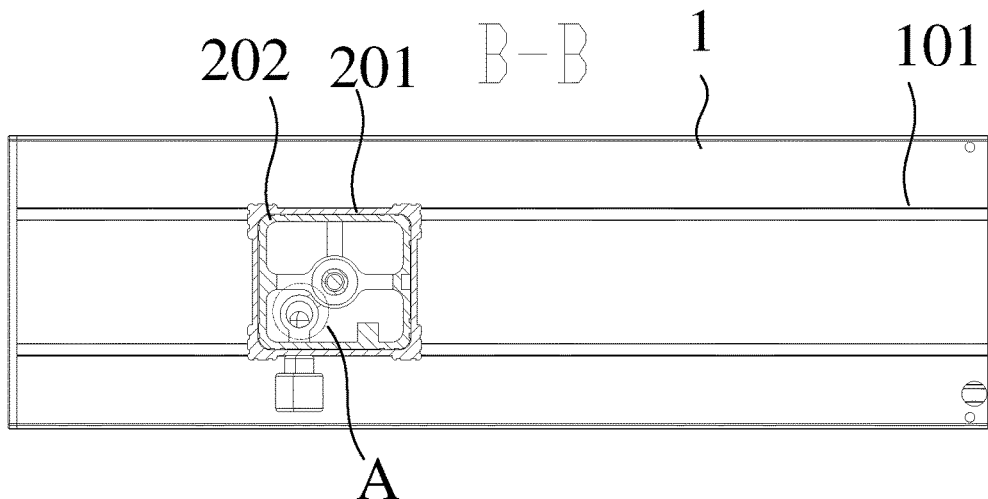
FIG. 2 is a cross-sectional view along B-B direction in FIG. 1.
Figure 5:
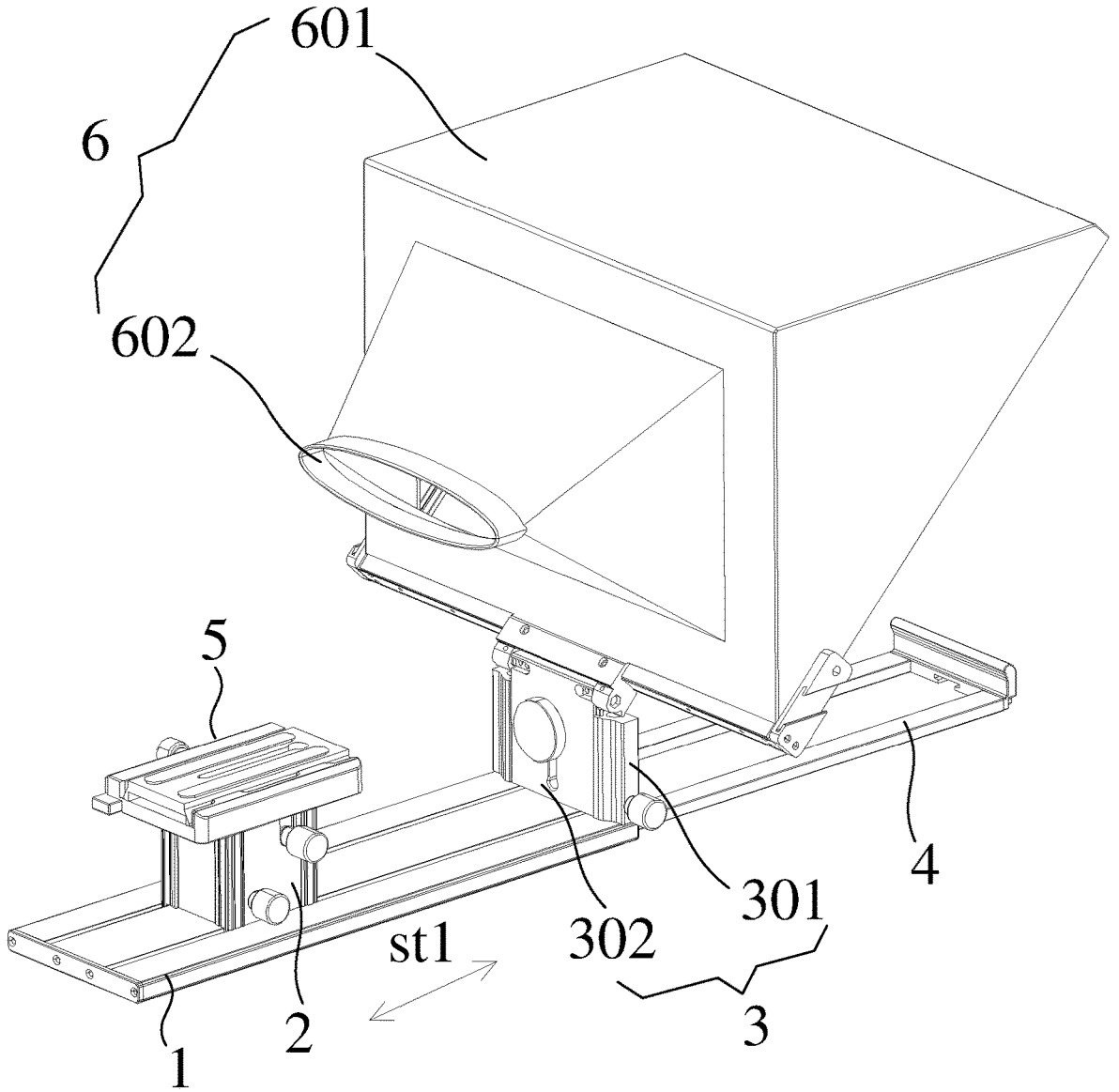
FIG. 5 is a schematic structural view of a prompter according to an embodiment of the present application.
Figure 16:
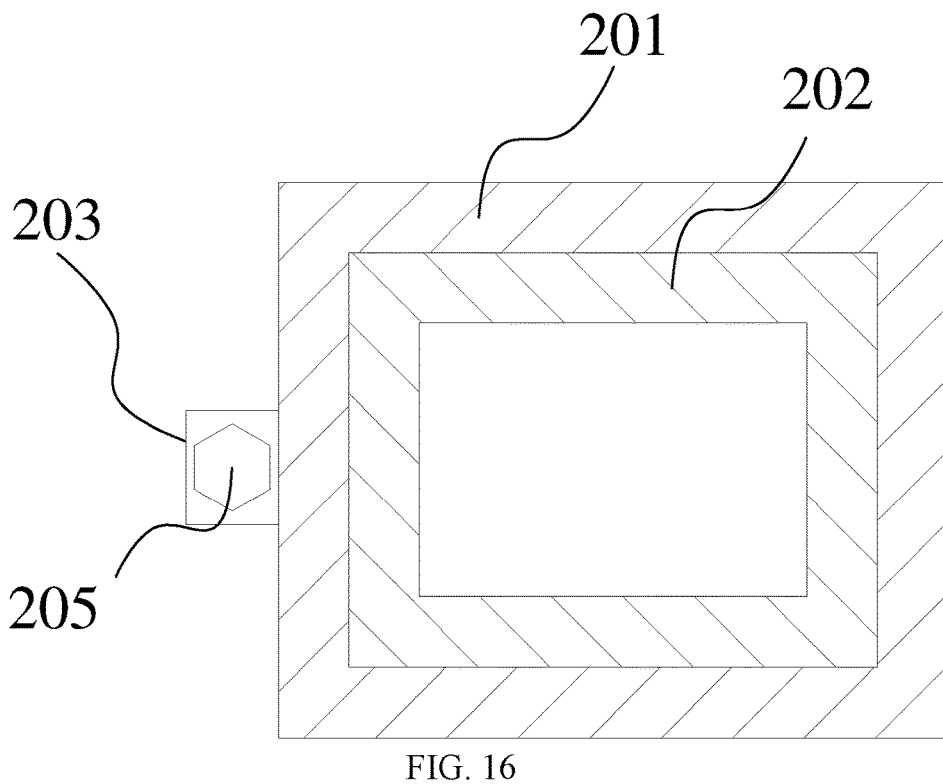
FIG. 16 is a schematic structural view according to another embodiment of the limit sleeve and the telescopic seat in FIG. 2 being mated.

In a specific embodiment, referring to FIGS. 2, 5 and 16, when the telescopic seat 2 is slidably installed on the base 1, a track is provided on the base 1. The track is configured to be a guide groove 101 opened on the base 1, and the structure of the guide groove 101 includes but is not limited to a convex structure and an L-shaped cross-section structure. Meanwhile, the bottom of the outer shell 210 is connected with a sliding block 211 whose cross-section is of an L-shaped structure, and the sliding block 211 and the guide groove 101 are in slide snap fit. Under the cooperation of the sliding block 211 and the guide groove 101, the telescopic seat 2 is allowed to move on the base 1 along direction st1.

In the technical solution of the present application, the position adjustment assembly is applied to the prompter, the camera can be installed on the telescopic seat 2 of the position adjustment assembly. By adjusting the distance between the camera and the frame through the sliding cooperation between the telescopic seat 2 and the base 1, the horizontal position adjustment function of the camera can be realized. When it needs to adjust the height of the camera, it can be adjusted through the telescopic seat 2, which allows the lens of the camera and the opening of the blackout cloth to be horizontal, and then cameras of different specifications can be used in the prompter. Meanwhile, through the sliding adjustment, the difficulty of adjusting the camera in the prompter can be reduced, and the convenience of adjusting the device is improved.

In an embodiment, referring to FIGS. 6, 7, 10 and 16, the telescopic seat 2 includes an outer shell 201 and an inner shell 202 that can be telescoped inside the outer shell 201. The bottom of the outer shell 201 slides with the guide groove 101, the inner shell 202 is nested inside the outer shell 201 and can be telescoped in direction st2 along the inner wall of the outer shell 201, in which, the inner wall of the outer shell 201 is used as a guide groove. In another embodiment, the telescopic seat 2 can also be telescoped in another way, specifically, the outer shell 201 is telescoped outside the inner shell 202 along direction st2, and when the outer shell 201 is telescoped along direction st2, the inner shell 202 slides with the base 1. In more detail, referring to FIG. 13, the bottom of the telescopic seat 2 is connected with a sliding block 211, and the sliding block 211 cooperates with guide groove 101. According to the guide grooves 101 of different structures, the structure of the sliding block 211 is also different. For example, when the cross-section structure of the guide groove 101 is of an L-shaped structure, the sliding block 211 can also be an L-shaped cross-section structure; and in order to facilitate the movement of the telescopic seat 2, the bottom of the sliding block 211 is embedded with rolling pieces. The rolling pieces include but are not limited to rolling balls, rolling cylinders, and the like. The rolling pieces can reduce the friction between the telescopic seat 2 and the base 1.

Figure 3:
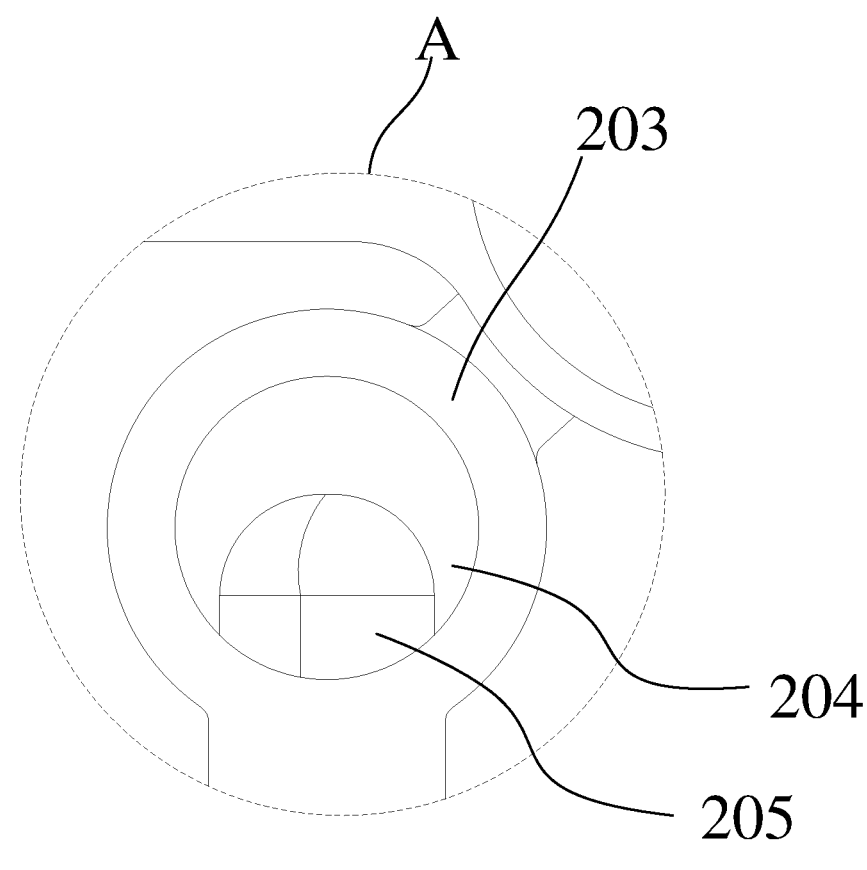
FIG. 3 is an enlarged view of part A in FIG. 2.
Figure 4:
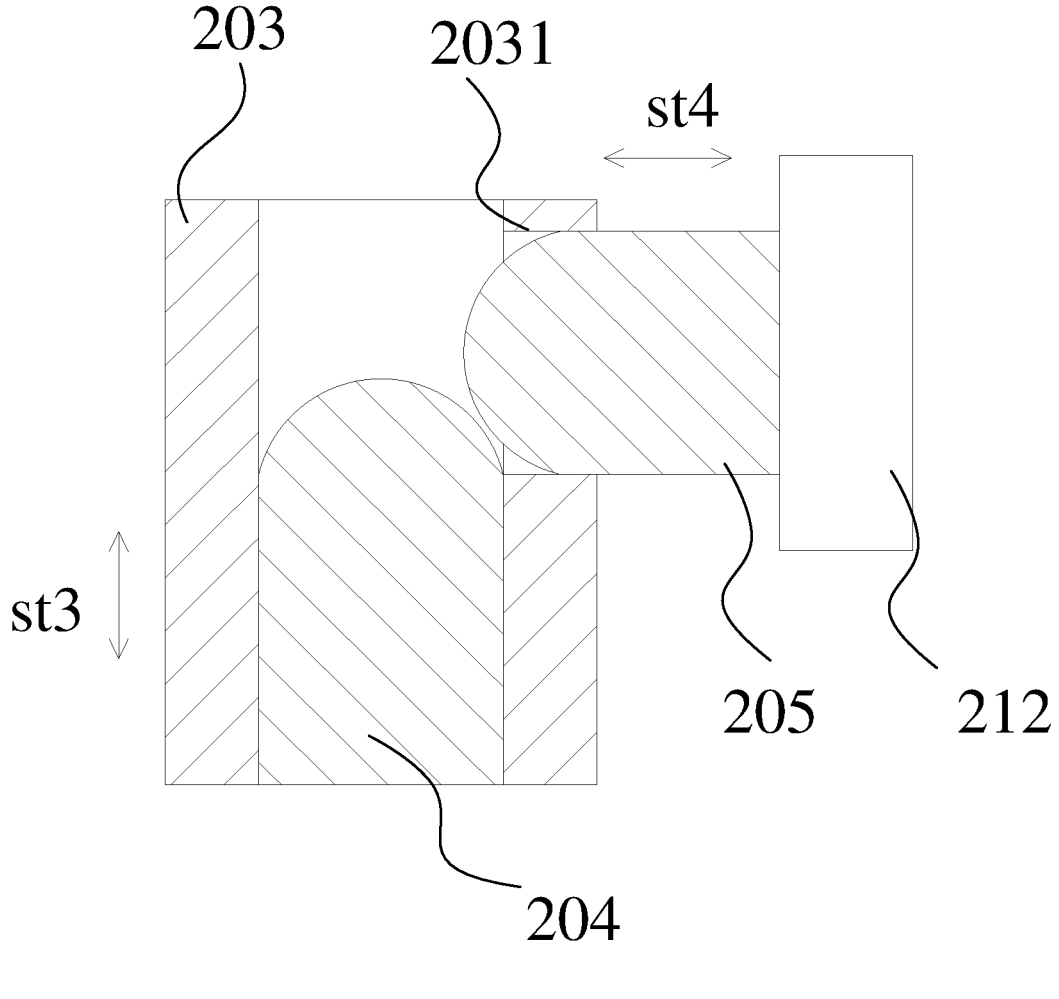
FIG. 4 is a schematic internal structural view of the limit sleeve in FIG. 3.

Referring to FIGS. 2 to 4, the telescopic seat 2 can slide on the base 1. In an embodiment, when the telescopic seat 2 slides on the base 1 to a preset position, in order to lock the telescopic seat 2 at that position, a positioning column 204 is telescopic mounted on the telescopic seat 2, and the positioning column 204 is connected with an operation piece 205. By driving the operation piece 205, the positioning column 204 can be driven to move close to or move away from the base 1, so that the positioning column 204 has a locking position and an unlocking position. For the locking position, the positioning column 204 abuts against the base 1 to restrict the sliding of the telescopic seat 2. For the unlocking position, the positioning column 204 unabuts or release the base 1, so that the telescopic seat 2 can slide relative to the base 1 and locked. Further, when the positioning column 204 abuts against the base 1, the friction between the positioning column 204 and the base 1 can fix the telescopic seat 2 on the surface of the base 1. In another embodiment, an insertion joint can be adopted, that is, the top face of the base 1 is provided with a plurality of recesses arranged along the sliding orientation of the telescopic seat 2 that cooperate with the positioning column 204, the positioning column 204 can be inserted into the recess on a preset position where the telescopic seat 2 slides to, and the telescopic seat 2 can be fixed at the preset position on the top of the base 1 by the cooperation of the positioning column 204 and the recess.

Figure 9:
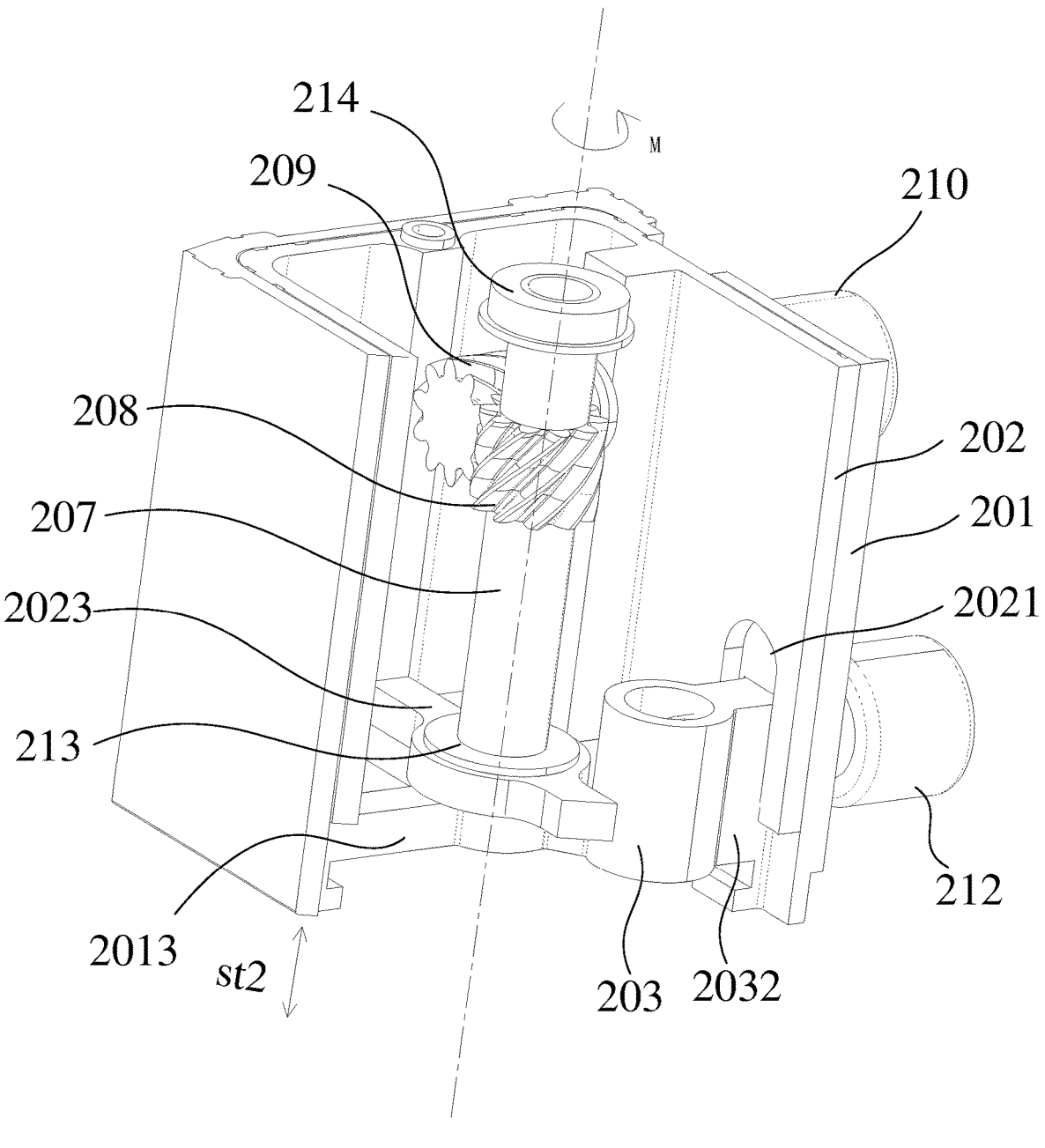
FIG. 9 is a schematic internal structural view according to an embodiment of the telescopic seat in FIG. 5.

In an embodiment, referring to FIGS. 4, 9 and 10, the setting method of the operation piece 205 and the positioning column 204 includes: the positioning column 204 is arranged inside the telescopic seat 2, a limit sleeve 203 is provided inside the telescopic seat 2, and the limit sleeve 203 is connected to and fixed on the inner wall of the outer shell 201; a second avoidance notch 2021 is opened on the side wall of the inner shell 202. As shown in FIGS. 2 and 9, the limit sleeve 203 can be connected to the outer shell 201 through a reinforcing rib 2032 or a connecting piece, so that the limit sleeve 203 can be fixed on the inner wall of the outer shell 201. One end of the reinforcing rib 2032 or other connecting piece is connected to the inner wall of the outer shell 201, and the other end of the reinforcing rib 2032 or other connecting piece is connected and fixed to the limit sleeve 203. As shown in FIG. 9, the reinforcing rib 2023 connected to the limit sleeve 203 is threaded through the second avoidance notch 2021 and the reinforcing rib 2023 is positioned in the second avoidance notch 2021, so that the limit sleeve 203 is arranged inside the inner shell 202. In another embodiment, the reinforcing rib 2032 or other connecting piece can be saved, and the outer wall of the limit sleeve 203 can be directly connected to the inner wall of the outer shell 201, and the limit sleeve 203 is accommodated in the second avoidance notch 2021, that is, at least part of the limit sleeve 203 is threaded through the second avoidance notch 2021 and located inside the inner shell 202. When the inner shell 202 is nested installed in the outer shell 201, the second avoidance notch 2021 faces the limit sleeve 203, the second avoidance notch 2021 provides an accommodation space for the limit sleeve 203, the reinforcing rib 2023 or other connecting piece, and the connecting piece for fixing the limit sleeve 203 such as the reinforcing rib 2032 can be accommodated in the position of the second avoidance notch 2021. In addition, the second avoidance notch 2021 is extended along the telescoping direction st2 of the inner shell 202, the length of the extension of the second avoidance notch 2021 along the direction st2 is not less than the stroke of the telescoping of the inner shell 202, and the bottom of the second avoidance notch 2021 facing the base 1 is opened, in this way, when the inner shell is telescoped and the limit sleeve 203 or the reinforcing rib 2032 contacts with the edge of the second avoidance notch 2021, the inner shell 202 is prevented from touching the limit sleeve 203, the reinforcing rib 2032 or other connecting piece when being telescoped.

As shown in FIG. 4, the positioning column 204 can be slidably installed inside the limit sleeve 203 along direction st3. The structure of the top of the positioning column includes but is not limited to a hemispherical, a frustum of a cone-shaped, and an arc-shaped structure. The operation piece 205 is configured to be a threaded rod. A threaded hole 2031 is opened on the limit sleeve 203, and the axis of the threaded hole 2031 is perpendicular to the axis of the limit sleeve 203. This structural design allows the operation piece 205 to be rotated in a direction perpendicular to the axis of the limit sleeve 203 to control the sliding of the positioning column 204 along the limit sleeve 203. The operation piece 205 can be arranged on the side surface of the outer shell 201 for easy operation. The operation piece 205 is threaded into the threaded hole 2031, and one end of the operation piece 205 is in contact with the top of the positioning column 204. The structure of the end of the operation piece 205 in contact with the top of the positioning column 204 includes but is not limited to a hemispherical, a frustum of a cone-shaped, and an arc-shaped structure accordingly. For example, as shown in FIG. 4, the top of the positioning column 204 and one end of the operation piece 205 are both of an arc-shaped structure or a hemispherical structure. When rotating the operation piece 205 to make it move into the limit sleeve 203 along direction st4, the arc-shaped structure of the operation piece 205 abuts against the arc-shaped structure of the top of the positioning column 204, which makes the positioning column 204 move towards the base 1 along direction st3 and being abutted against the base 1. Since the telescopic seat 2 is in snap joint with the base 1, the friction between the positioning column 205 and the base 1 can fix the telescopic seat 2 on the top of the base 1, and the purpose of positioning and locking is achieved. The other end of the operation piece 205 is threaded through the limit sleeve 203 and the telescopic seat 2 to the outer side of the telescopic seat 2 to be connected to a first driving member 212. The first driving member 212 can be a knob for manual operation, and can also be a motor and related transmission members for electrically controlling the rotation of the operation piece 205. The operation piece 205 and the telescopic seat 2 or the limit sleeve 203 are in a threaded connection.

Figures 14, 15:
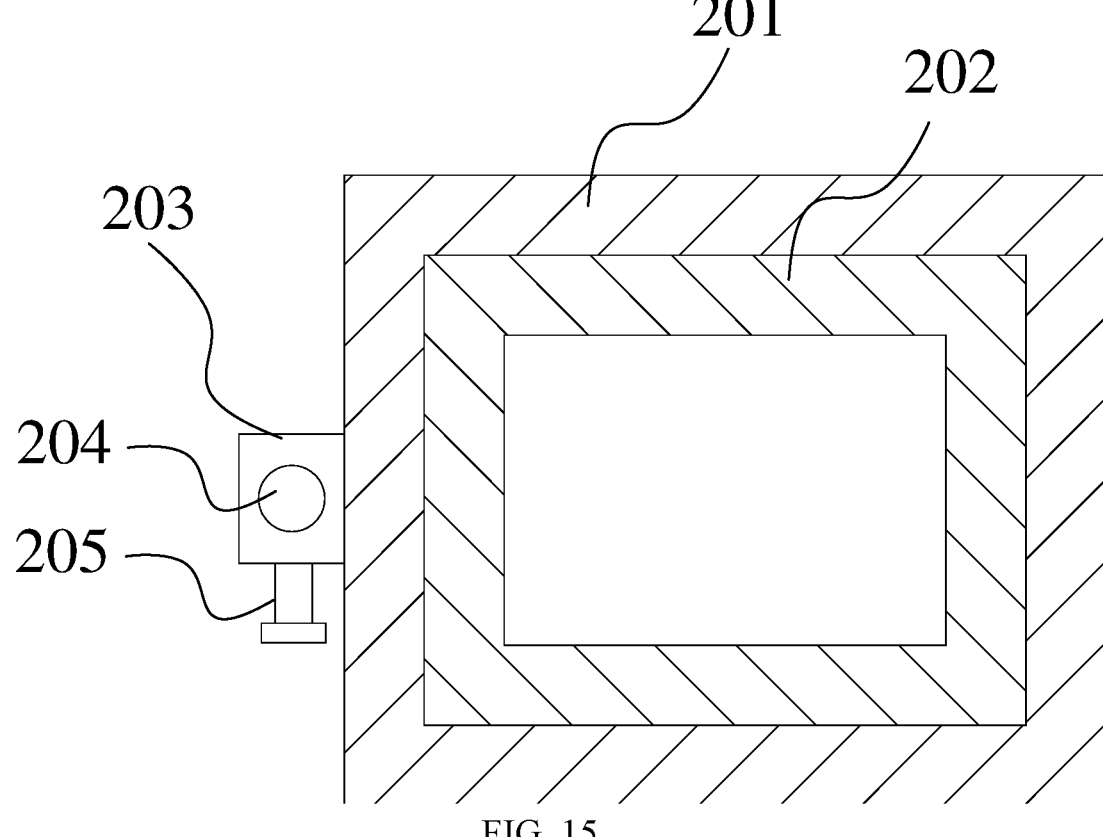
FIG. 14 is a schematic structural view according to another embodiment of the inner shell and the outer shell of the telescopic seat of the position adjustment assembly in FIG. 1 being mated.
FIG. 15 is a schematic structural view according to an embodiment of the limit sleeve and the telescopic seat in FIG. 2 being mated.

In other embodiments, referring to FIG. 15 showing the cross-section of the telescopic seat 2, in addition to being arranged inside the inner shell 202 of the telescopic seat 2, the positioning column 204 can also be arranged outside the telescopic seat 2, and this design omits the second avoidance notch 2021. The limit sleeve 203 is provided outside the telescopic seat 2, the positioning column 204 is located inside the limit sleeve 203, one end of the positioning column 204 away from the base 1 is of an arc-shaped surface structure, a threaded hole 2031 is opened on the side wall of the limit sleeve 203, the axis of the threaded hole 2031 is perpendicular to the axis of the limit sleeve 203, the operation piece 205 is located in the threaded hole 2031, the operation piece 205 is configured to be a threaded rod, one end of the threaded rod is of an arc-shaped surface structure, the operation piece 205 and the limit sleeve 203 are in a threaded connection, the other end of the threaded rod is connected with a first driving member 212, the first driving member 212 can be a knob driving the threaded rod to rotate, and the knob is located at the outer side of the limit sleeve 203. The threaded rod can be driven to move to the inside of the limit sleeve 203 by rotating the knob, so that the end of the threaded rod that is of an arc-shaped surface is abutted against the end of the positioning column 204 that is of an arc-shaped surface, and the positioning column 204 is driven to move close to the base 1 in the limit sleeve 203 to press the base 1, so that the bottom of the positioning column 204 is abutted against the base 1, and the telescopic seat 2 is fixed at a designated position on the base 1 by friction, which prevents the telescopic seat 2 from continuing to slide on the base 1 and achieves the purpose of locking the position.

In an embodiment, referring to FIG. 16, the positioning column 204 is arranged outside the telescopic seat 2, and the limit sleeve 203 is provided outside the telescopic seat 2. The top of the limit sleeve 203 is opened to have a threaded hole extending downwards, the axis of the threaded hole is coincident with the axis of the limit sleeve 203. The operation piece 205 is arranged to be vertical, and the operation piece 205 is configured as a bolt. One end of the operation piece 205 is configured to be connected to the positioning column 204, that is, one end of the operation piece 205 close to the base 1 is abutted against one end of the positioning column 204 away from the base 1. The operation piece 205 is threaded into the threaded hole. The operation piece 205 is driven to move towards the base 1 by rotating the operation piece 205 to press the positioning column 204, so that the positioning column 204 is abutted against the top of the base 1, and the telescopic seat 2 is fixed at a designated position on the base 1 by friction.

Figure 17:
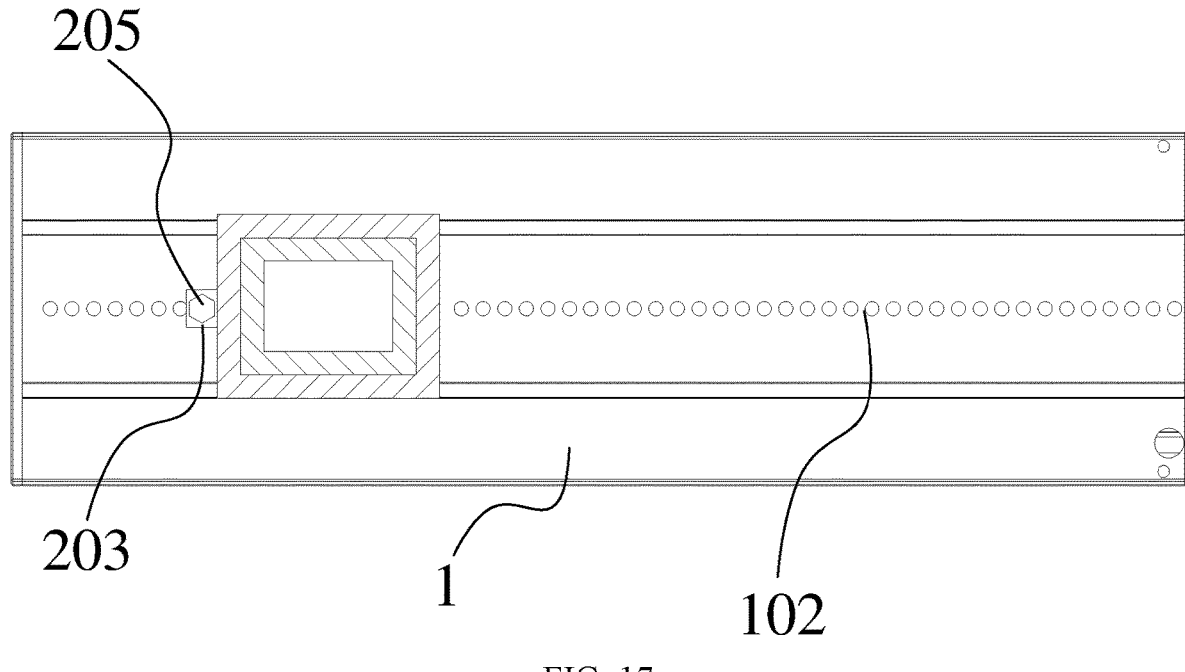
FIG. 17 is a schematic structural view according to an embodiment of the limit sleeve, the telescopic seat, and the base in FIG. 2 being mated.

In an embodiment, referring to FIG. 17, a plurality of openings or recesses 102 is provided on the top of the base 1, the positioning column 204 is arranged outside the telescopic seat 2, the limit sleeve 203 is provided outside the telescopic seat 2, and the positioning column 204 is located inside the limit sleeve 203. The operation piece 205 is connected to the outer side of the positioning column 204 for operating the positioning column 204 to insert into the recess or pull out from the recess. The operation piece 205 and the positioning column 204 are fixed together. When the positioning column 204 is inserted into the recess, the telescopic seat 2 is fixed at a designated position on the top of the base 1; and when the positioning column 204 is pulled out from the recess, the telescopic seat 2 can slide on the base 1.

In addition to being able to slide on the base 1, the telescopic seat 2 can also be telescoped and lifted. In an embodiment, in order to achieve the telescopic effect of the telescopic seat 2, a telescopic member is installed inside the telescopic seat 2. An end of the telescopic member is connected to the outer shell 201, and the other end of the telescopic member is connected to the inner shell 202. The driving member drives the telescopic member to telescope. The driving member can be electrically driven or manually driven. The telescopic member is used to adjust the telescopic seat 2 so that it can be telescoped along direction st2 in FIG. 6, thereby achieving the height adjustment of cameras of different structures.

In an embodiment, the cross-sections of the outer shell 201 and the inner shell 202 perpendicular to the axis of the threaded rod 206 are square, so that the rotation of the inner shell 202 relative to the outer shell 201 is restricted. The inner shell 202 and the outer shell 201 can be a prismatic structure, such as a triangular prism, a quadrangular prism, and a pentagonal prism, etc. As shown in FIG. 16, the inner shell 202 and the outer shell 201 are of a quadrangular prism structure. Referring to FIG. 14, the inner shell 202 and the outer shell 201 can also be a circular tube structure. When the inner shell 202 and the outer shell 201 are of the circular tube structure, a guide groove 2024 needs to be opened on the outer side of the inner shell 202 along its length direction. The inner wall of the outer shell 201 is connected with a fixture block 2014. The function of restricting the inner shell 202 inside the outer shell 201 in a circumference direction is achieved by the cooperation of the fixture block 2014 and the guide groove 2024. In this way, the inner shell 202 cannot rotate inside the outer shell 201, and a problem that the inner shell 202 rotates while lifting or moving, the camera therefore rotates, which affects the shooting effect, is prevented under the action of the above-mentioned structure.

Referring to FIGS. 6 to 9, 11 and 16, in some embodiments, the telescopic member includes a screw 206 and a moving rod 207. The bottom of the screw 206 and the outer shell 201 are fixed together. The outer shell 201 is connected with a first installation plate 2013 inside. The nut of the screw 206 is fixed on the first installation plate 2013, they can be fixed by ways of welding, clamping, etc. In one embodiment, the bottom of the screw 206 is of a prismatic structure, that is, the cross-section of the bottom of the screw 206 is a non-circular cross-section. The top of the installation plate 2013 is provided with an installation recess that cooperates with the prismatic structure of the bottom of the screw 206. The prismatic structure of the bottom of the screw 206 is inserted into the installation recess, and the bottom of the screw 206 that is of a non-circular cross-section is restricted by interference fit in the installation recess, so that the screw 206 is prevented from rotating in the installation recess. The moving rod 207 is axially hollow and is provided with an internal thread that matches with the thread of the screw 206. The moving rod 207 is threaded on the outer side of the screw 206. The inner shell 202 is connected with a second installation plate 2023 inside the inner shell 202 and near the bottom of the inner shell 202, when the inner shell 202 telescopes in the outer shell 201, the second installation plate 2023 of the inner shell 202 is located above the installation plate 2013 of the outer shell 201, as is shown in FIG. 9. The moving rod 207 and the second installation plate 2023 can be in clearance fit, and can also be rotatably snap jointed through a first bearing 213, the first bearing 213 is mounted on the second installation plate 2023. In another embodiment, referring to FIGS. 6 and 8 to 11, one end of the moving rod 207 is installed with a first bearing 213, and the other end is installed with a second bearing 214. The first bearing 213 is installed on the second installation plate 2023, and the second bearing 214 is installed on the back of the fast installation plate 5 fixed on the top of the inner shell 202. The camera is installed on the other side of the fast installation plate 5 opposite to the back. In this way, the two ends of the moving rod 207 are supported and fixed by the first bearing 213 and the second bearing 214, respectively, and the moving rod 207 can rotate relative to the first bearing 213 and the second bearing 214.

Figure 11:
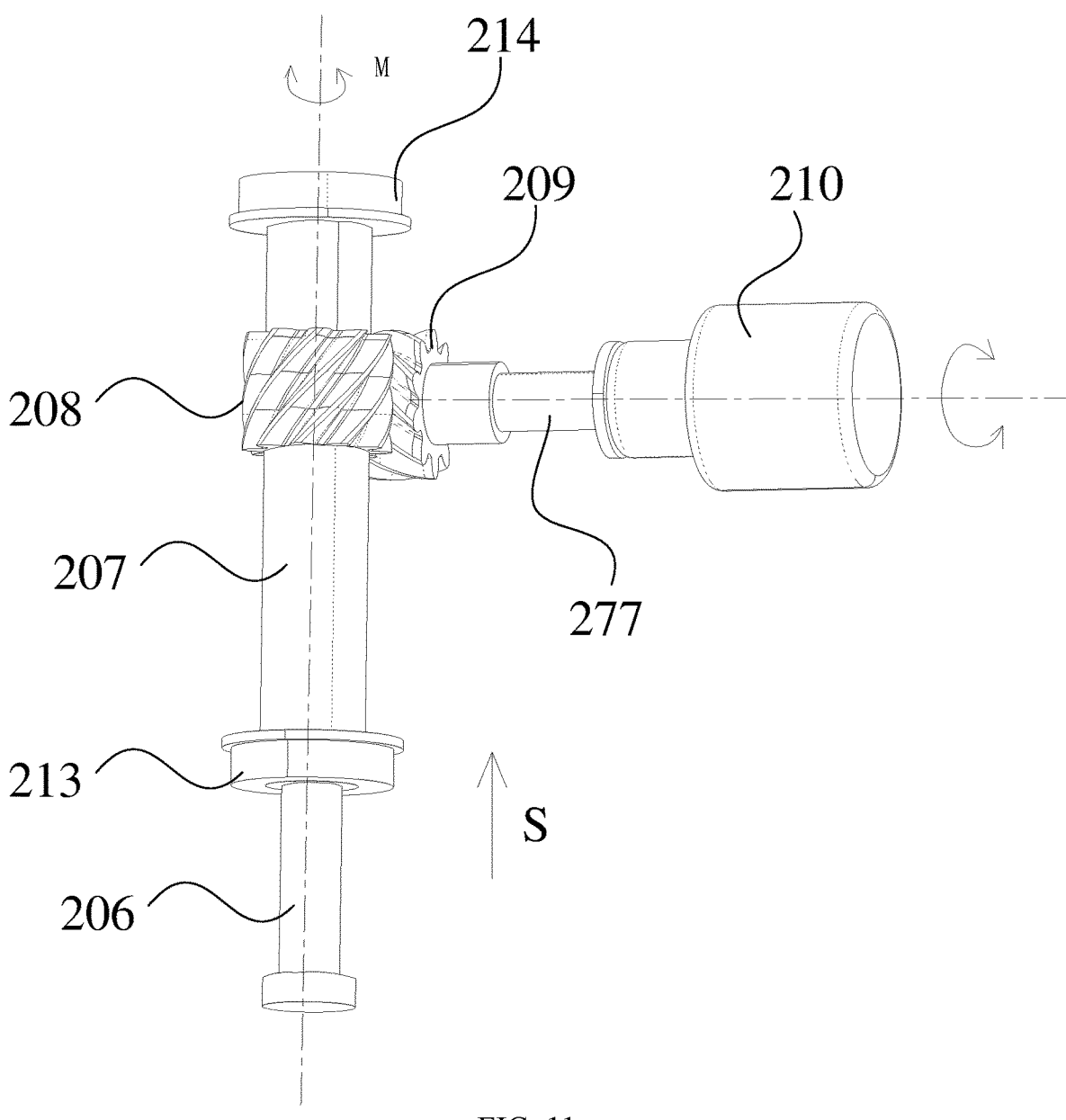
FIG. 11 is a schematic structural view according to an embodiment of the telescopic member in FIG. 5.
Figure 12:
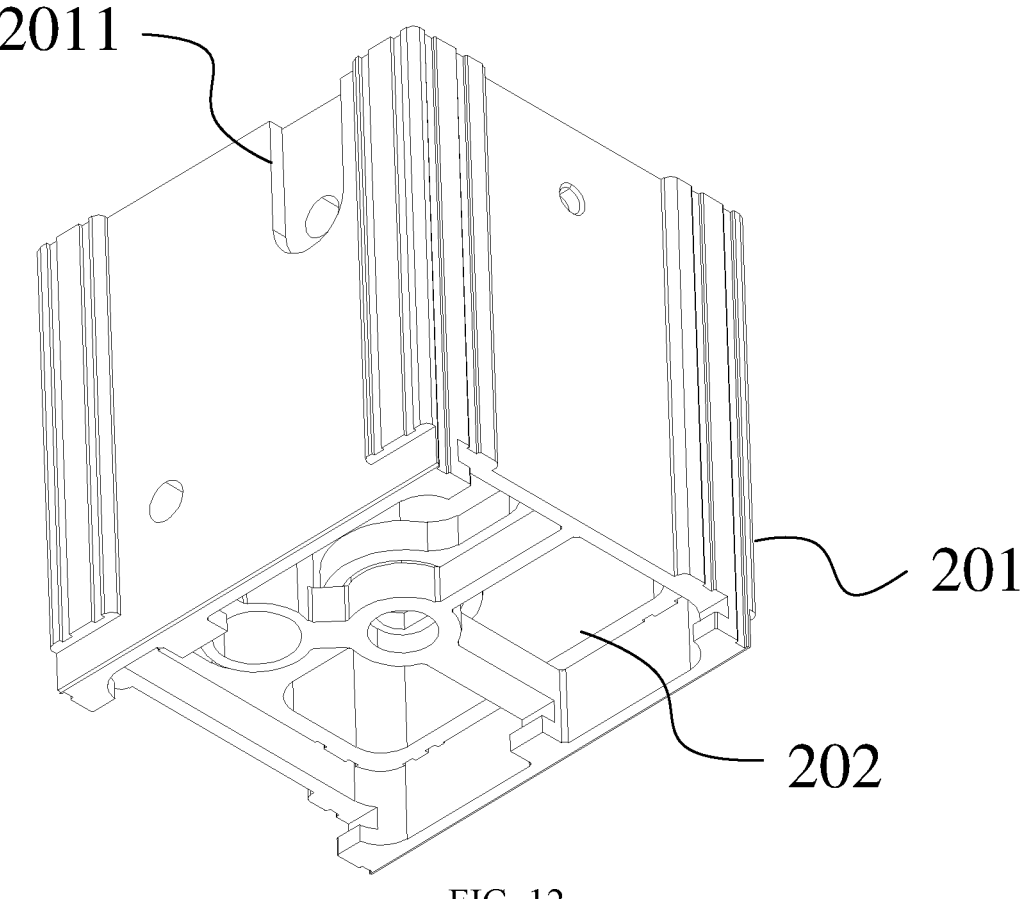
FIG. 12 is a schematic structural view according to an embodiment of the inner shell and the outer shell of the telescopic seat of the position adjustment assembly in FIG. 1 being mated.

As shown in FIG. 11, when the driving member 208 drives the moving rod 207 rotate relative to the screw 206 along direction M, as the bottom of the screw 206 is fixed on the first installation plate 2013 of the outer shell 201, the rotation of the moving rod 207 that matches and nests with the screw 206 can make the moving rod 207 spin out the screw 206 along direction S, and the moving rod 207 extends along direction S, thereby driving the inner shell 202 fixed with the moving rod 207 to extend.

In terms of the design of the driving member, in an embodiment, the driving member includes a driven member fixed on the outer side of the moving rod 207, an active member cooperating with the driven member, and a second driving member. That is, a driven member 208 is fixed on the outer side of the moving rod 207, the driven member 208 cooperates with an active member 209, one end of the active member 209 extending to the outer side of the outer shell 201 is connected with a second driving member 210. The second driving member 210 is used to drive the active member 209 to rotate, thereby driving the driven member 208 to rotate and realizing the rotation of the moving rod 207. Since the moving rod 207 and the second installation plate 2023 are connected through the first bearing 213, the inner shell 202 will not rotate when the moving rod 207 rotates. Meanwhile, during the rotation process of the moving rod 207, the rotation of the moving rod 207 allows the moving rod 207 to be uplifted or lowered by itself under the relation of the threaded connection with the screw 206 which is fixed on the installation plate 2013 of the outer shell 201, which makes the telescopic member move along direction st2 in FIG. 6 to achieve the telescoping of the telescopic member. The second driving member 210 can be a knob or an electric motor. In an embodiment, referring to FIG. 7, the driven member 208 is a worm gear, and the active member 209 is a worm. By the cooperation of the worm and the worm gear, the worm gear can be driven to rotate by rotating the worm, but the worm gear cannot drive the worm to rotate. In an embodiment, when a knob is used as the second driving member 210, one end of the worm is located on the outer side of the telescopic seat 2, and the knob is connected to the end of the worm, or the knob is connected to one end of a rod 277, while the other end of the rod 277 is coupled to the worm; the end that is mounted with the knob is extended to and located on the outer side of the telescopic seat 2, and then the worm is operated to drive the worm gear to rotate, thereby realizing the rotation of the moving rod 207. It can choose to manually drive by choosing the knob to drive, and when the rotation is stopped, the inner shell is uplifted to a preset height; when the knob is released, due to the self-locking between the worm and the worm gear, the inner shell will not slide down by itself. Therefore, by using the design scheme of the worm and the worm gear as a lifting driving device, the height of the inner shell can be adjusted in a stepless manner, and after the height of the inner shell is adjusted, the inner shell will not automatically fall after releasing the knob. In order to realize the function of self-locking between the worm and the worm gear, the worm can be a single-head worm, thereby realizing the positioning function of the telescopic member after being telescoped.

The second driving member 210 can be an electric motor to drive the worm to rotate forwards or backwards. When choosing an electric motor as the second driving member 210, the electric motor and the worm can be both arranged inside the telescopic member. The electric motor can be controlled to realize the forward and backward rotation and the start and stop function by a programmable logic controller (PLC).

Referring to FIGS. 6, 9 to 11, 15 and 16, a first avoidance notch 2011 is provided at a position of the upper end of the outer shell 201 corresponding to the second driving member 210. The first avoidance notch 2011 is extended along the moving direction st2 of the inner shell 202. The length of the first avoidance notch 2011 is not less than the stroke of the inner shell 202. The active member 209 is threaded through the inner shell 202 and the first avoidance notch 2011 in sequence and extended to the outside of the outer shell 201. The second driving member 210 is located outside the outer shell 201 and connected to the active member 209. In this way, the active member 209 can be driven to rotate by rotating the second driving member 210 outside the outer shell 201.

Referring to FIGS. 9 to 11, when rotating the second driving member 210 exposed outside the outer shell 202, the moving rod 207 is driven to rotate by rotating the active member 209, and the moving rod 207 is driven to move along direction st2, thereby driving the inner shell 202 connected to the moving rod 207 to move upwards along direction st2. At this point, as shown in FIG. 9 and FIG. 10, the inner shell 202, the first bearing 213 installed on the second installation plate 2023 of the inner shell 202, the moving rod 207, the active member 209, the second driving member 210 connected to the active member 209, the second bearing 214, and the fast installation plate 5 installed on the second bearing 214 move upwards together as a whole along direction st2. Since the inner shell 202 moves upwards relative to the outer shell 201 and the outer shell stays still on the base 1, the first avoidance notch 2011 provided on the outer shell 201 is used to accommodate the active member 209 or the moving rod 277 and allows the active member 209 to pass through the first avoidance notch 2011, which can prevent that, when the inner shell 209 moves to drive the active member 209 to be lifted, an interference occurring between the active member 209 and the outer shell 201, so that the active member 209 is unable to be driven to follow the inner shell 202 to be uplifted and lowered. The second driving member 210 is arranged outside the outer shell 201 for the user easy to operate the knob to adjust the height of the inner shell.

Figure 13:
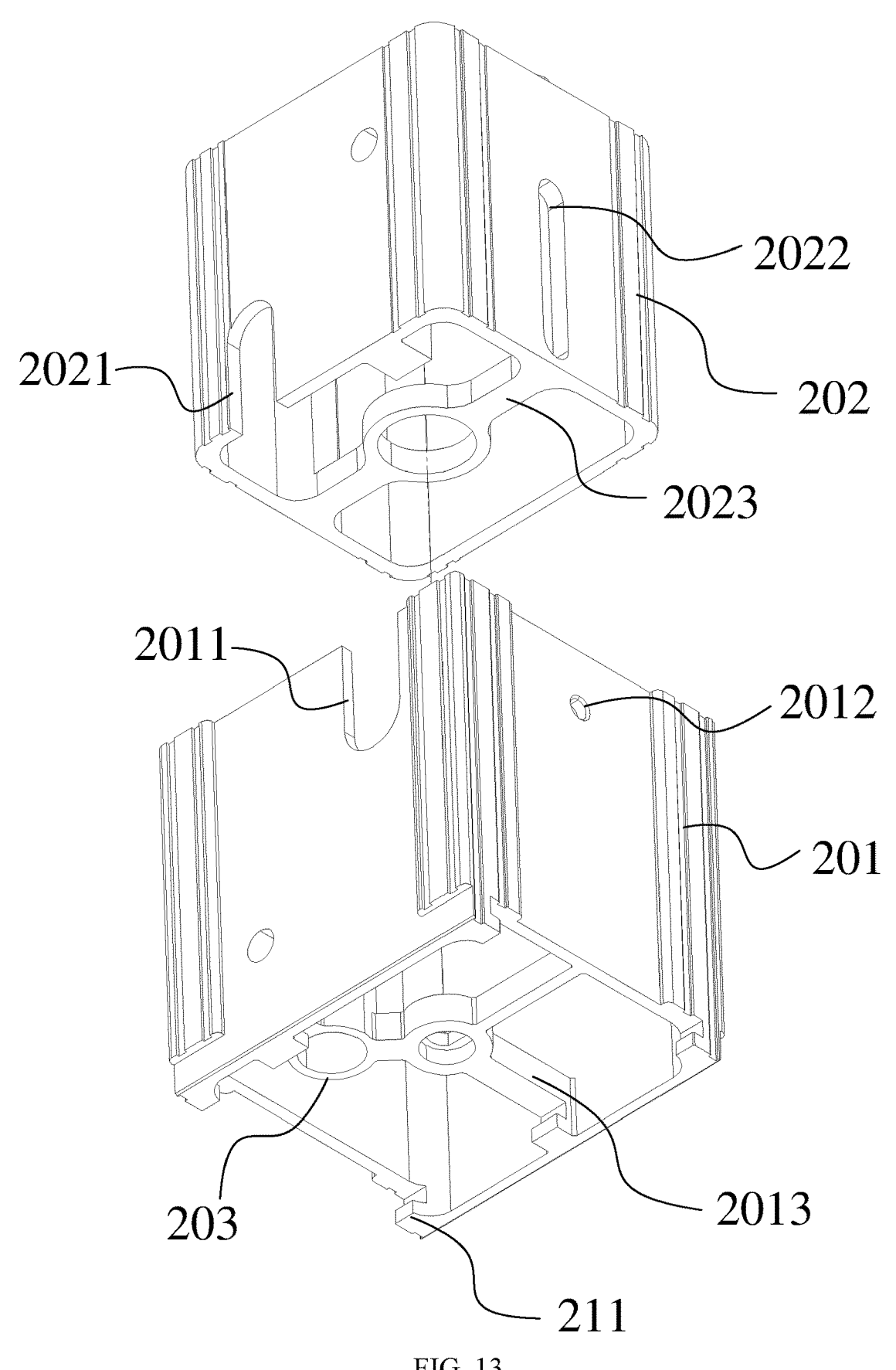
FIG. 13 is an exploded schematic structural view of the inner shell and the outer shell of the telescopic seat of the position adjustment assembly in FIG. 1.

In an embodiment, referring to FIG. 13, in order to avoid a separation of the outer shell 201 and the inner shell 202 during the extension process and thus the movement extreme position of the inner shell is limited, the outer side of the inner shell 202 is provided with a long bar-shaped limit groove 2022, and the outer side of the inner shell 201 is provided with a installation hole 2012. The installation hole 2012 is connected with a limit rod cooperating with the limit groove 2022. One end of the limit rod is located in the limit groove 2022. The limit rod and the installation hole 2012 can be in threaded connection. When the inner shell 202 is extended along direction st2 in FIG. 6 away from the base 1, the limit groove 2022 will be driven to extend upwards together. Since one end of the limit rod is located in the limit groove 2022, when the inner shell 202 is extended outwards to the extreme position, the limit rod can be abutted to the inner end face of the limit groove 2022, thereby restricting the inner shell 202 to extend outwards and preventing the inner shell 202 from separating from the outer shell 201.

The present application further provides a prompter, which includes a reflection member 6, a front support plate 4 and a position adjustment assembly. The specific structure of the position adjustment assembly can be referred to the above-mentioned embodiments. Since this prompter adopts all the technical solutions of the above-mentioned embodiments, it therefore has at least all the beneficial effects brought by the technical solutions of the above embodiments, which will not be repeated here. The front support plate 4 is used to place a display device, the reflection member 6 is used to reflect the content displayed by the display device. The reflection member 6 includes a frame, a blackout cloth 601 covered on the outer side of the frame, and a reflection mirror. An opening 602 is formed on the outer side of the blackout cloth facing the position adjustment assembly. The frame is connected to the base 1 of the position adjustment assembly through an installation support 3. The installation support 3 includes a fixed plate 301 and a movable plate 302. The fixed plate 301 and the base 1 are in a fixed connection. The fixed plate 301 is provided with a dovetail groove on the outer side. The movable plate 302 is located in the dovetail groove. The fixed plate 301 is connected with a fixing nut on the outer side for fixing the movable plate 302. The moving direction of the movable plate 302 is up and down.

The camera is connected to the position adjustment assembly through the fast installation plate 5, and can also be connected to the position adjustment assembly through a camera cage structure. The position adjustment assembly can adjust the distance between the camera and the reflection member 6, and can also adjust the height of the camera, so that cameras of different specifications can face the opening 602.

In an embodiment, the interior of the base 1 is a hollow structure. The front support plate 4 is located inside the base 1, and the front support plate 4 is connected to the base 1 by a spile structure. After the front support plate 4 is pulled out, the display device can be placed on the front support plate 4.

The above-mentioned embodiments are only some embodiments of the present application, and are not intended to limit the scope of the present application. Any equivalent structure conversion made with reference to the description and the accompanying drawings of the present application, direct or indirect application in other related technical fields, should all be included by the scope of the present application.

What is claimed is:

1. A position adjustment assembly, comprising:
   a base;
   a telescopic seat, wherein a bottom of the telescopic seat is movably installed on the base, the telescopic seat comprises an outer shell and an inner shell slidably nested inside the outer shell, and the inner shell is telescoped along the outer shell;
   a limit sleeve connected to the outer shell;
   a positioning column slidably installed on the limit sleeve; and
   an operation piece,
   wherein a bottom of the outer shell is slidably installed on the base; and
   one end of the positioning column directly faces the base, another end of the positioning column faces the operation piece, and the operation piece is configured to move to drive the positioning column to press or release the base.

2. The position adjustment assembly of claim 1, wherein a telescopic member is provided inside the telescopic seat, one end of the telescopic member is connected to the outer shell, and another end of the telescopic member is connected to the inner shell.

3. The position adjustment assembly of claim 2, wherein the telescopic member comprises:

a screw fixed to the outer shell;

a moving rod threaded on an outer side of the screw and rotatably connected to the inner shell; and a driving member configured to drive the moving rod to rotate relative to the screw, so that the moving rod spins out or spins in the screw to drive the inner shell to extend or retract relative to the outer shell.

4. The position adjustment assembly of claim 2, wherein the telescopic member comprises:

a screw fixed to the inner shell;

a moving rod threaded on an outer side of the screw and rotatably connected to the outer shell; and a driving member configured to drive the moving rod to rotate relative to the screw, so that the moving rod spins out or spins in the screw to drive the inner shell to extend or retract relative to the outer shell.

5. The position adjustment assembly of claim 3, wherein the driving member comprises a driven member fixed on an outer side of the moving rod, an active member cooperating with the driven member, and a second driving member;

wherein an upper end of the outer shell is provided with a first avoidance notch extending in a telescoping direction of the inner shell, the active member is passed through the inner shell and the first avoidance notch in sequence and extended to an outer side of the outer shell, and the second driving member is located on the outer side of the outer shell and connected to the active member.

6. The position adjustment assembly of claim 5, wherein the active member is configured to be a worm, the driven member is configured to be a worm gear, and the worm gear is fixed on the outer side of the moving rod; the second driving member is configured to be a knob for operating a rotation of the worm.

7. The position adjustment assembly of claim 5, wherein the active member comprises a rod and a worm, the driven member is configured to be a worm gear, and the worm gear is fixed on the outer side of the moving rod; the second driving member is configured to be a knob for operating a rotation of the worm; and one end of the rod is coupled with the worm, the other end of the rod is passed through the inner shell and the first avoidance notch in sequence and extended to the outer side of the outer shell, and the knob is located on the outer side of the outer shell and connected to the active member.

8. The position adjustment assembly of claim 1, wherein the inner shell further comprises a second avoidance notch, the limit sleeve comprises a threaded hole, an axis of the threaded hole intersects an axis of the limit sleeve, the limit sleeve is passed through the second avoidance notch and arranged inside the inner shell;

a top end of the positioning column is arc-shaped or hemispherical;

the operation piece is configured to be a screw cooperating with the threaded hole, one end of the screw is connected to a first driving member, another end of the screw is arc-shaped or hemispherical; an arc-shaped surface or a hemispherical end face of the screw faces an arc-shaped surface or a hemispherical end face of the positioning column when the screw is threaded through the threaded hole; and the arc-shaped surface or hemispherical end face of the screw is configured to abut or move away from the arc-shaped surface or hemispherical end face of the positioning column to push the positioning column to press or to release the base.

9. The position adjustment assembly of claim 8, wherein an axis of the threaded hole located at the limit sleeve is perpendicular to an axis of the limit sleeve.

10. A prompter, comprising:

a reflection member;

a front support plate; and the position adjustment assembly of claim 1, wherein the front support plate is configured to place a display device, the reflection member is configured to reflect content displayed by the display device.

* * * * *